United States Patent [19]

Hinkemeyer

[11] Patent Number: 4,503,620
[45] Date of Patent: Mar. 12, 1985

[54] AXIS ALIGNMENT GAUGE

[75] Inventor: Roy T. Hinkemeyer, Clear Water, Minn.

[73] Assignee: The Vision-Ease Corporation, St. Cloud, Minn.

[21] Appl. No.: 524,600

[22] Filed: Aug. 19, 1983

[51] Int. Cl.³ .............................................. G01B 5/00
[52] U.S. Cl. .................................. 33/185 R; 33/1 M; 33/174 TA; 33/181 R
[58] Field of Search .................... 33/185 R, 464, 1 M, 33/180 R, 181 R, 174 H, 174 TA, 169 C

[56] References Cited
U.S. PATENT DOCUMENTS 4,358,896 11/1982 Thomas .......................... 33/185 R
4,414,748 11/1983 Gauler et al. ........................ 33/1 M

OTHER PUBLICATIONS

"Operating & Maintenance Instructions"–R. H. Strasbaugh, Inc., Dated Jan. 24, 1974.
"Parts & Operation Manual 505 Cylinder Machines" –Coburn Optical Industries, Inc.–Sep. 1976.

Primary Examiner—Willis Little
Attorney, Agent, or Firm—Jacobson & Johnson

[57] ABSTRACT

An apparatus and method of aligning the axis of drive pins on a cylinder machine with the axis of a lap adapter on a cylinder machine wherein one of a plurality of displaceable members are mounted in the lap adapter of a cylinder machine and the displaceable members are displaced relative to one another until the drive pins are centered in a recess of one of the plurality of displaceable members to enable one to visually determine if the axis of the lap adapter is in alignment with the axis of the drive pins.

8 Claims, 6 Drawing Figures

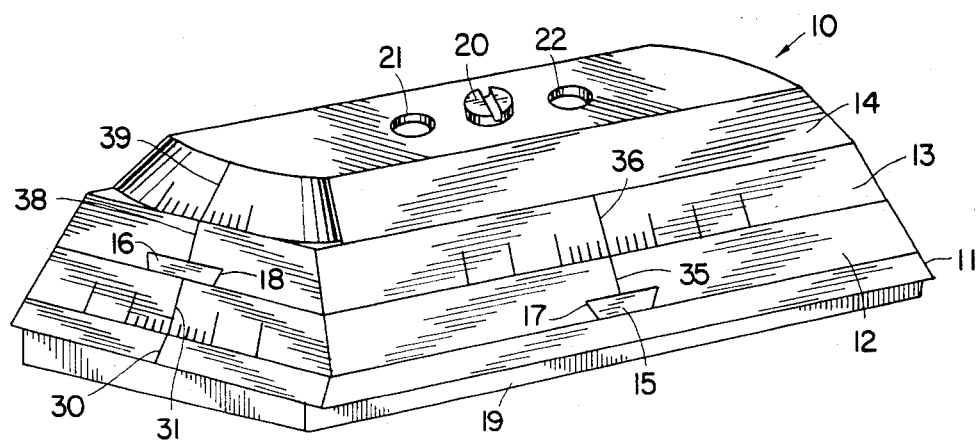
FIG.1
FIG.2
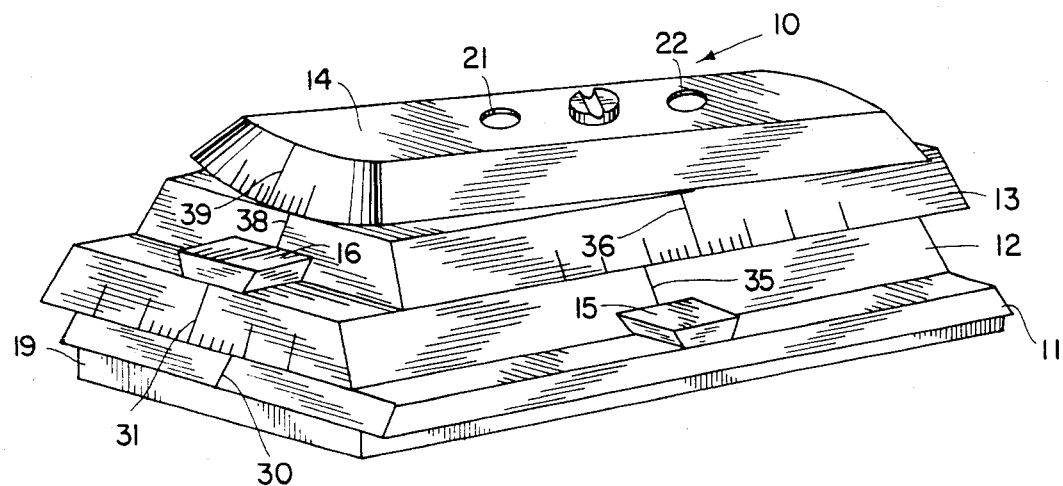

AXIS ALIGNMENT GAUGE

FIELD OF THE INVENTION

This invention relates generally to axis alignment devices and, more specifically, to an axis alignment gauge for checking the axis alignment on cylinder machines used for grinding optical lens surfaces.

BACKGROUND OF THE INVENTION

Cylinder machines for grinding a radiused optical lens surface are old in the art. One such cylinder machine is sold by Coburn Optical Industries of Muskogee, Oklahoma. Another such cylinder machine is sold by R. Howard Strasbaugh, Inc. of Long Beach, California. In general, the cylinder machine comprises a lower lens abrading surface or lap adapter that is driven in an oscillatory mode and a pin holder driven in a second oscillatory mode with the pin holder having two drive pins for holding and pushing the lens back and forth over the oscillating lens abrading surface. It is the composite motion of the pin holder and the lap adapter that generates a lens surface wherein the mutually perpendicular cross curves have different radii of curvature. Through use the axis of the pin holders may become misaligned with respect to the axis of the lap adapter. If the axis of the pin holder is not in alignment with the axis of the lap adapter, the cylinder machine grinds a lens with misalignment of the optical axes of the lens. If the radius of curvature of the lens surface is the same in all directions, the optical axis misalignment of the lens does not create any problem; however, if the radius of curvatures are different in mutually perpendicular directions, misalignment of the axis of the pin holder and the axis of the lap adapter produces an unacceptable lens. Since both the lap adapter and the drive pin move relative to one another, it is difficult to determine if the axis of the pin holder is in proper alignment with the axis of the lap adapter unless one manually drives the cylinder machine through a number of full cycles.

The present invention provides an apparatus for checking the alignment of the axis of the drive pin with respect to the axis of the lap adapter regardless of what portion of the abrading cycle the cylinder machine is stopped in and without having to manually drive the cylinder machine through a full cycle.

In general, the prior art method of aligning the axis of the pin holder and the axis of the lap adapter utilize an alignment block and an axis block. The axis block is mounted in the lap adapter and the alignment block having a V-groove extending longitudinally along the top of the alignment block is placed on top of the axis block. The axis misalignment is determined by manually rotating the drive mechanism of the cylinder machine through a number of cycles and observing the rotational displacement on both ends of the block. If the rotational displacement on the ends of the blocks is uneven, one adjusts the axis of pins until it visually appears the rotational displacement of the ends of the blocks are equal as one rotates the drive mechanism through a couple cycles.

BRIEF DESCRIPTION OF THE DRAWINGS

FIG. 1 is a perspective view of the axis alignment gauge;

FIG. 2 is a perspective view showing the displacement of the members in the axis alignment gauge;

BRIEF SUMMARY OF THE INVENTION

Figure 3:
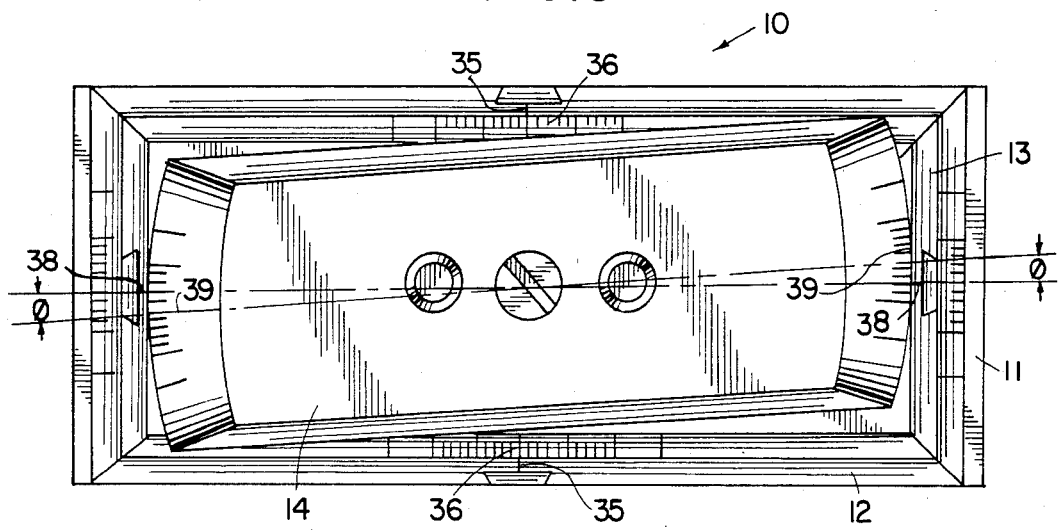
FIG. 3 is a top view showing rotational displacement of the top member in the axis alignment gauge.

Briefly, the invention comprises a plurality of displaceable members wherein the displacement of each of the members in relation to its adjacent member can be readily determined by markings on the faces of the members with the rotational displacement of one of the members providing a visual indication of the misalignment of the pin holder and lap adapter attached thereto.

DESCRIPTION OF THE PREFERRED EMBODIMENT

Referring to FIG. 1, reference numeral 10 generally designates my axis alignment gauge having a first lower rectangular base member 11 and a second trapezoidal shaped member 12 located in lateral slidable displacement on top of base member 11. Located in longitudinal slidable displacement on top of member 12 is a third trapezoidal shaped member 13 and located on rotational displacement on top of member 13 is a fourth trapezoidal shaped member 14 having radiused end faces. Members 11, 12, 13 and 14 are stacked in pyramidal type of relationship on top of one another with each member either rotationally or slidably attached to its adjacent member.

Extending across the top of base member 11 and fastened thereto is a dove tail 15 which slidingly engages a dove tail recess 17 in member 12 to permit lateral slidable displacement of member 12 with respect to member 11. Similarly, located on top of and extending longitudinally along base block 12 and fastened thereto is a dove tail 16 which slidingly engages a dove tail recess 18 in member 13 to permit longitudinal slidable displacement of member 13 with respect to member 12. Dove tail 15 and dove tail 16 are located at right angles to one another so that displacement of members 12 and 13 are at right angles to one another. Located on the top of member 14 and extending through an opening in member 14 is a shoulder head screw 20 which fastens into member 13 to provide for rotational displacement of member 14 with respect to member 13.

In order to determine the amount of displacement of members 12 and 13 or rotation of member 14 with respect to their adjacent members the faces of members 11, 12, 13 and 14 are provided with sets of alignment marks and scales. That is, on the front face of member 12 there is an alignment mark 35 and correspondingly located on the front face of member 13 is a scale 36. Similarly, on the back face of member 12 there is an alignment mark 35 and located on the back face of member 13 is scale 36. Located on the left end face of member 11 (FIG. 1) is an alignment mark 30 and the left end face of member 12 is an alignment scale 31. Similarly, located on the opposite end face of member 11 there is an identical alignment mark 30 and on the opposite end face of member 12 an identical alignment scale 31. Located on both end faces of member 13 is an alignment mark 38 and on both end faces of radiused members 14 is an alignment scale 39.

Figure 6:
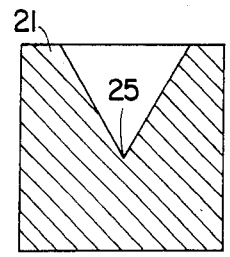
FIG. 6 is an enlarged cross sectional view of the axis alignment gauge engagement members.
Figure 5:
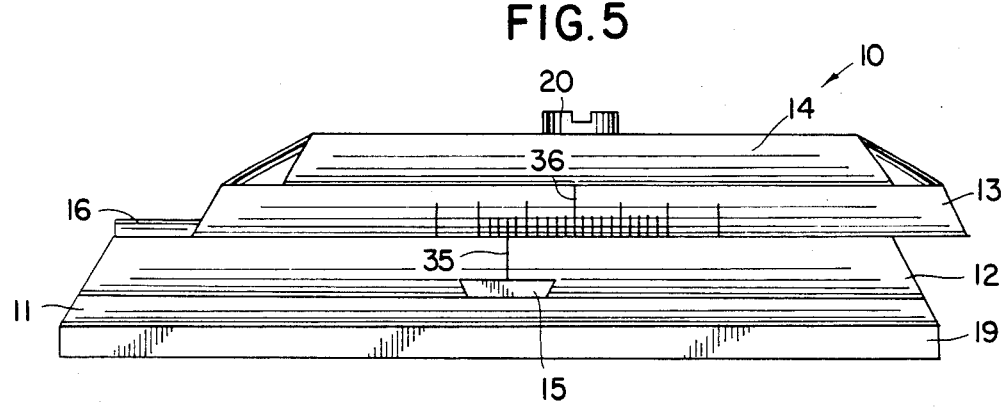
FIG. 5 is a front view showing the longitudinal displacement of the axis alignment gauge.

In order to illustrate the displacement modes of the invention reference should be made to FIG. 2 which illustrates an axis alignment gauge that is partially displaced laterally and longitudinally as well as partially rotated to show how members 11, 12, 13 and 14 can be displaced with respect to each other if axis alignment gauge 10 were being used to determine misalignment of the axis of a pin holder with respect to the axis of the lap adapter. Note, member 12 is laterally and slidably displaced along dove tail member 15 which is fastened securely to and extends across the top surface of member 11. Similarly, located on top of member 13 and extending the length of block member 12 is a dove tail member 16 which holds member 13 in longitudinal displaced slidable position with respect to member 12. Top member 14 which is located in rotational engagement on top of member 13 is slightly rotated. It is the lateral, longitudinal and rotational displacement features of gauge 10 which permits gauge 10 to measure misalignment in any portion of the abrading cycle without having to manually drive the cylinder machine through an abrading cycle. To align the pins in the pin holder with top member 14 top member 14 includes a pair of inserts 21 and 22 which have a conical recess for receiving the conical point of the drive pins. Normally, when lenses are ground in the cylinder machine the two drive pins fit into conical recess on the lens block. In order to locate the drive pins with respect to the axis alignment gauge the alignment gauge 10 contains inserts 21 and 22 with a pair of conical recesses for receiving the drive pins. FIG. 6 shows a cross sectional view of insert 21 revealing conical recess 25 for engaging a conical drive pin. Since insert 22 is identical to insert 21, insert 22 is not shown.

FIG. 3 shows the top view of axis alignment gauge 10 showing top member 14 has been rotationally displaced an angle $\theta$ with respect to axis alignment mark 38 on block 13.

Figure 4:
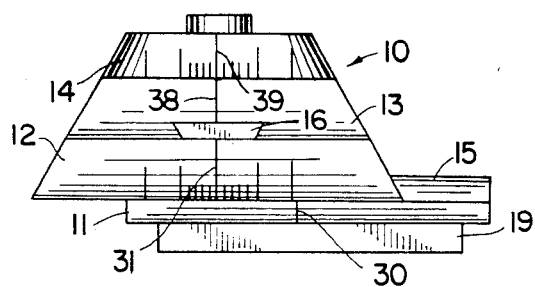
FIG. 4 is an end view showing lateral displacement of one member of the axis alignment gauge.

FIG. 4 illustrates how member 12 has been displaced laterally relative to member 11. Note, the amount of lateral displacement can be determined by use of alignment mark 30 and scale 31.

In operation of my axis alignment gauge 10 one slides and rotates members 12, 13 and 14 until drive pins on the cylinder machine are symmetrically seated in inserts 21 and 22. With the pins seated in inserts 21 and 22 one can visually determine the angle that top member 14 is rotated with respect to member 13 by looking at alignment mark 38 and scale 39. It is this angle $\theta$ which is a measure of the misalignment of the axis of the pins with the axis of the lap adapter. The purpose of slidable members 12 and 13 is to compensate for the position of the drive pins in their cycle of motion with respect to the lap adapter as well as provide information of displacement during any position of the cycle.

In summary, the process of checking for misalignment comprises the steps of inserting and fastening the base block 11 into the cylinder machine lap adapter, laterally and longitudinally displacing member 12 and member 13 while rotationally displacing member 14 until the axis pins are symmetrically seated in inserts 21 and 22. Next, one notes the angle $\theta$ between alignment scale 39 and alignment mark 30 to determine whether the axis of the drive pins is out of alignment with the axis of the lap adapter. If it is, one can, through adjustment of members on cylindrical machine, adjust the axis of the pins until the axes of the pins are in proper alignment with the axes of the lap adapter.

I claim:

1. An apparatus for determining alignment of the axis of the drive pins on a cylinder machine comprising:
   a set of members located in a stacked relationship;
   a base member for mounting in a cylinder machine lap adapter;
   a first member, said first member slidable on said base member in a first direction with respect to said base member;
   a second member slidably displaceable in a second direction on said first member with respect to said first member; and
   a third member located on said second member and rotationally displaceable with respect to said second member, said second member and said third member having means thereon for determining displacement of said member related to one another, said third member having means thereon for engagement of the drive pins of a cylinder machine.

2. The invention of claim 1 wherein said means includes visual means for indicating the rotational displacement of an adjacent member.

3. The invention of claim 2 wherein said means comprises an alignment mark and a scale.

4. invention of claim 3 wherein each of said members includes faces with said means located thereon.

5. The invention of claim 1 wherein said first member includes means for slidingly engaging said second member.

6. The invention of claim 5 including a fourth member wherein said fourth member includes means for slidingly engaging said first member.

7. The invention of claim 6 wherein said means for slidingly engaging said second member and said means for slidingly engaging said fourth member are located at right angles to one another.

8. The method of aligning the axis of a drive pin on a cylinder machine with the axis of a lap adapter on a cylinder machine comprising the steps of:
   fastening an axis alignment gauge having a plurality of displaceable members in a lap adapter of a cylinder machine;
   displacing the members in the axis alignment gauge until the drive pins are centered in a recess of the axis alignment gauge;
   measuring the rotational displacement of the displaceable member in the axis alignment gauge; and
   adjusting the axis of the drive pins in accordance with the rotational displacement of the displaceable member in axis alignment gauge.

* * * * *